United States Patent
Zhu

(10) Patent No.: US 9,991,991 B2
(45) Date of Patent: Jun. 5, 2018

(54) SIGNAL PROCESSING METHOD AND BASE STATION

(71) Applicant: Huawei Technologies Co., Ltd., Shenzhen (CN)

(72) Inventor: Xiaolong Zhu, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days. days.

(21) Appl. No.: 15/582,188

(22) Filed: Apr. 28, 2017

(65) Prior Publication Data
US 2017/0237526 A1    Aug. 17, 2017

Related U.S. Application Data

(63) Continuation of application No. PCT/CN2014/089961, filed on Oct. 31, 2014.

(51) Int. Cl.
*H04L 1/06* (2006.01)
*H04B 7/024* (2017.01)
*H04W 88/08* (2009.01)

(52) U.S. Cl.
CPC .......... *H04L 1/0625* (2013.01); *H04B 7/024* (2013.01); *H04L 1/0668* (2013.01); *H04W 88/08* (2013.01)

(58) Field of Classification Search
CPC ..... H04L 1/0625; H04L 1/0668; H04B 7/024; H04W 88/08
See application file for complete search history.

(56) References Cited

U.S. PATENT DOCUMENTS

| 7,742,389 | B2 | 6/2010 | Mujtaba |
| 9,380,466 | B2* | 6/2016 | Eyuboglu ............. H04W 16/26 |
| 2006/0008021 | A1 | 1/2006 | Bonnet |
| 2009/0180567 | A1* | 7/2009 | She ...................... H04B 7/0408 |
| | | | 375/267 |

(Continued)

FOREIGN PATENT DOCUMENTS

| CN | 1859068 A | 11/2006 |
| CN | 1968043 A | 5/2007 |

(Continued)

OTHER PUBLICATIONS

3rd Generation Partnership Project; Technical Specification Group Radio Access Network; Evolved Universal Terrestrial Radio Access (E-UTRA); Physical Channels and Modulation (Release 12), 3GPP TS 36.211 V12.3.0 (Sep. 2014), 124 pages.

(Continued)

*Primary Examiner* — Freshteh N Aghdam
(74) *Attorney, Agent, or Firm* — Slater Matsil, LLP

(57) ABSTRACT

Embodiments of the present invention disclose a signal processing method and a base station. The method may include: performing, by a base station, packet assembly, code modulation, and multi-antenna processing on downlink channel data, so as to form antenna port signals. The method may also include performing, by the base station, orthogonal transform on the antenna port signals according to a preset matrix used for orthogonal transform, and simultaneously sending, by the base station, orthogonally transformed antenna port signals to user equipment by using different antennas, where cells covered by the different antennas have a same cell identity.

17 Claims, 4 Drawing Sheets

(56) References Cited

U.S. PATENT DOCUMENTS

| | | | |
|---|---|---|---|
| 2012/0231809 A1* | 9/2012 | Siomina | H04W 64/00 |
| | | | 455/456.1 |
| 2013/0083681 A1 | 4/2013 | Ebrahimi Tazeh Mahalleh et al. | |
| 2013/0128760 A1* | 5/2013 | Fujishima | H04B 7/022 |
| | | | 370/252 |
| 2014/0185528 A1* | 7/2014 | Shimezawa | H04W 52/42 |
| | | | 370/328 |
| 2014/0198869 A1* | 7/2014 | Melzer | H04B 7/0417 |
| | | | 375/267 |

FOREIGN PATENT DOCUMENTS

| | | |
|---|---|---|
| CN | 101174867 A | 5/2008 |
| CN | 101516133 A | 8/2009 |
| EP | 2869478 A1 | 5/2015 |
| WO | 2014007512 A1 | 1/2014 |

OTHER PUBLICATIONS

Nortel, "Discussion on RS Design for High-order MIMO in LTE-A," 3GPP TSG-RAN Working Group 1 Meeting #56 R1-090751, Athens, Greece, Feb. 9-13, 2009, 6 pages.
Fujitsu, "Antenna virtualization in DL MIMO scenario B," 3GPP TSG RAN WG1 Meeting #67, R1-114179, San Francisco, USA, Nov. 14-18, 2011, 4 pages.
Nokia Siemens Networks, "Integrating power balancing network into 4Tx MIMO," 3GPP TSG RAN WG1 Meeting #67, R1-120652, Dresden, Germany, Feb. 6-10, 2011, 3 pages.

* cited by examiner

SIGNAL PROCESSING METHOD AND BASE STATION

CROSS-REFERENCE TO RELATED APPLICATIONS

This application is a continuation of International Patent Application No. PCT/CN2014/089961, filed on Oct. 31, 2014, the disclosure of which is hereby incorporated by reference in its entirety.

TECHNICAL FIELD

The present invention relates to the field of communications technologies, and in particular, to a signal processing method and a base station.

BACKGROUND

With rapid development of wireless communications, a data transmission rate up to dozens of megabits even hundreds of megabits per second is required in a future mobile communications system. With given radio spectrum resources, in a multiple-input multiple-output (MIMO) technology using multiple transmit antennas and multiple receive antennas, by using a spatial degree of freedom, a system capacity and coverage can be improved, a user rate can be increased, and user experience can be improved.

For example, in a distributed 4×2 MIMO networking scenario, two base stations and four antenna ports are configured. Each base station includes two physical antennas. Four antenna port signals may be separately transmitted by using four physical antennas, that is, each physical antenna transmits one antenna port signal. If user equipment is close to one base station and is far from the other base station, downlink propagation path losses of the four physical antennas are different. Consequently, channel powers that are received and used by the user equipment to perform data demodulation are imbalanced, and downlink transmission efficiency is reduced.

SUMMARY

Embodiments of the present invention provide a signal processing method and a base station, so as to improve downlink transmission efficiency.

A first aspect of the present invention provides a base station. The base station includes a processing unit, configured to perform packet assembly, code modulation, and multi-antenna processing on downlink channel data, so as to form antenna port signals, where the processing unit is further configured to perform orthogonal transform on the antenna port signals according to a preset matrix used for orthogonal transform. The base station also includes a sending unit, configured to simultaneously send orthogonally transformed antenna port signals to user equipment by using different antennas, where cells covered by the different antennas have a same cell identity.

In a first possible implementation manner, the base station further includes: a setting unit, configured to set, according to an antenna quantity and an antenna port quantity, a row quantity and a column quantity of the matrix used for orthogonal transform, so as to generate the matrix used for orthogonal transform, where each element in the matrix used for orthogonal transform has an equal modulus value, the row quantity of the matrix used for orthogonal transform is the antenna quantity, and the column quantity is the antenna port quantity.

With reference to the first possible implementation manner of the first aspect, in a second possible implementation manner, when the antenna port quantity is equal to the antenna quantity, the matrix used for orthogonal transform is an orthogonal matrix; or when the antenna port quantity is less than the antenna quantity, the matrix used for orthogonal transform includes at least one submatrix that can constitute an orthogonal matrix; or when the antenna port quantity is greater than the antenna quantity, the matrix used for orthogonal transform is a submatrix in an orthogonal matrix.

With reference to the first possible implementation manner of the first aspect or the second first possible implementation manner of the first aspect, in a third possible implementation manner, the processing unit is specifically configured to: set a correspondence between all rows of elements in the matrix used for orthogonal transform and the different antennas, and then separately perform linear superposition on the antenna port signals according to the rows of elements respectively corresponding to the different antennas, so as to obtain linearly superposed signals respectively corresponding to the different antennas, where the correspondence means that all the rows of elements and the different antennas are in a one-to-one correspondence, and the linearly superposed signals include linearly superposed signals of the antenna port signals.

With reference to the first possible implementation manner of the first aspect, or the second possible implementation manner of the first aspect, or the third possible implementation manner of the first aspect, in a fourth possible implementation manner, the setting unit is further configured to: when a change of the antenna port quantity and/or the antenna quantity is detected, update the matrix used for orthogonal transform.

A second aspect of the present invention provides a base station. The base station includes a processor, a communications interface, and a memory, where the communications interface is configured to communicate with user equipment. The memory is configured to store a program. The processor is configured to execute the program, so as to implement the following steps: performing packet assembly, code modulation, and multi-antenna processing on downlink channel data, so as to form antenna port signals; performing orthogonal transform on the antenna port signals according to a preset matrix used for orthogonal transform; and simultaneously sending orthogonally transformed antenna port signals to the user equipment by using different antennas, where cells covered by the different antennas have a same cell identity.

In a first possible implementation manner, the processor is further configured to: set, according to an antenna quantity and an antenna port quantity, a row quantity and a column quantity of the matrix used for orthogonal transform, so as to generate the matrix used for orthogonal transform, where each element in the matrix used for orthogonal transform has an equal modulus value, the row quantity of the matrix used for orthogonal transform is the antenna quantity, and the column quantity is the antenna port quantity.

With reference to the first possible implementation manner of the second aspect, in a second possible implementation manner, when the antenna port quantity is equal to the antenna quantity, the matrix used for orthogonal transform is an orthogonal matrix; or when the antenna port quantity is less than the antenna quantity, the matrix used for orthogonal transform includes at least one submatrix that can constitute an orthogonal matrix; or when the antenna port quantity is greater than the antenna quantity, the matrix used for orthogonal transform is a submatrix in an orthogonal matrix.

With reference to the first possible implementation manner of the second aspect or the second possible implementation manner of the second aspect, in a third possible implementation manner, the processor is specifically configured to: set a correspondence between all rows of elements in the matrix used for orthogonal transform and the different antennas, where the correspondence means that all the rows of elements and the different antennas are in a one-to-one correspondence; and separately perform linear superposition on the antenna port signals according to the rows of elements respectively corresponding to the different antennas, so as to obtain linearly superposed signals respectively corresponding to the different antennas, where the linearly superposed signals include linearly superposed signals of the antenna port signals.

With reference to the first possible implementation manner of the second aspect, or the second possible implementation manner of the second aspect, or the third possible implementation manner of the second aspect, in a fourth possible implementation manner, the processor is further configured to: when a change of the antenna port quantity and/or the antenna quantity is detected, update the matrix used for orthogonal transform.

A third aspect of the present invention provides a signal processing method. The method includes performing, by a base station, packet assembly, code modulation, and multi-antenna processing on downlink channel data, so as to form antenna port signals. The method also includes performing, by the base station, orthogonal transform on the antenna port signals according to a preset matrix used for orthogonal transform. The method also includes simultaneously sending, by the base station, orthogonally transformed antenna port signals to user equipment by using different antennas, where cells covered by the different antennas have a same cell identity.

In a first possible implementation manner, before the step of performing, by the base station, orthogonal transform on the antenna port signals according to a preset matrix used for orthogonal transform, the method further includes: setting, by the base station according to an antenna quantity and an antenna port quantity, a row quantity and a column quantity of the matrix used for orthogonal transform, so as to generate the matrix used for orthogonal transform, where each element in the matrix used for orthogonal transform has an equal modulus value, the row quantity of the matrix used for orthogonal transform is the antenna quantity, and the column quantity is the antenna port quantity.

With reference to the first possible implementation manner of the third aspect, in a second possible implementation manner, when the antenna port quantity is equal to the antenna quantity, the matrix used for orthogonal transform is an orthogonal matrix; or when the antenna port quantity is less than the antenna quantity, the matrix used for orthogonal transform includes at least one submatrix that can constitute an orthogonal matrix; or when the antenna port quantity is greater than the antenna quantity, the matrix used for orthogonal transform is a submatrix in an orthogonal matrix.

With reference to the first possible implementation manner of the third aspect or the second possible implementation manner of the third aspect, in a third possible implementation manner, the performing, by the base station, orthogonal transform on the antenna port signals according to a preset matrix used for orthogonal transform includes: setting a correspondence between all rows of elements in the matrix used for orthogonal transform and the different antennas, where the correspondence means that all the rows of elements and the different antennas are in a one-to-one correspondence; and separately performing linear superposition on the antenna port signals according to the rows of elements respectively corresponding to the different antennas, so as to obtain linearly superposed signals respectively corresponding to the different antennas, where the linearly superposed signals include linearly superposed signals of the antenna port signals.

With reference to the first possible implementation manner of the third aspect, or the second possible implementation manner of the third aspect, or the third possible implementation manner of the third aspect, in a fourth possible implementation manner, the method further includes: when a change of the antenna port quantity and/or the antenna quantity is detected, updating, by the base station, the matrix used for orthogonal transform.

It can be learned that in the embodiments of the present invention, orthogonal transform is performed on antenna port signals according to a preset matrix used for orthogonal transform, and orthogonally transformed antenna port signals are simultaneously sent to user equipment by using antennas having different geographical locations, so that channel powers of all antenna ports received by the user equipment are always balanced, and downlink transmission efficiency is improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
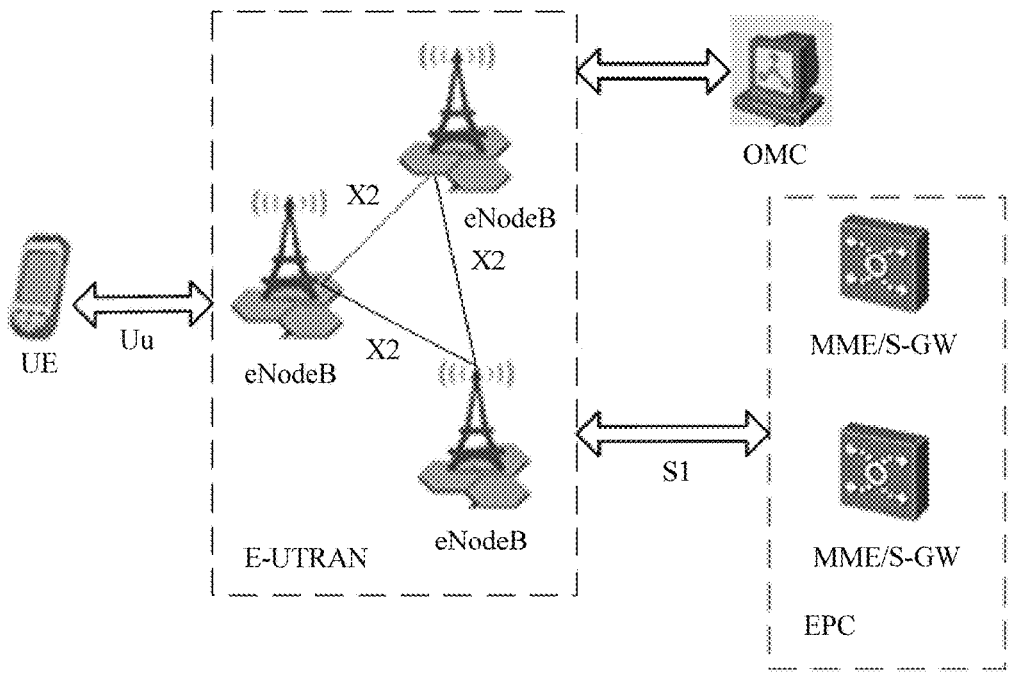
FIG. 1 is a schematic diagram of a scenario of an LTE system according to an embodiment of the present invention.

Referring to FIG. 1, FIG. 1 is a schematic diagram of a scenario of an LTE system according to an embodiment of the present invention.

In FIG. 1, an evolved NodeB (eNodeB) is an access device in a Long Term Evolution (LTE) system. An evolved universal terrestrial radio access network (E-UTRAN) includes one or more eNodeBs. The eNodeB communicates with user equipment (UE) by using a Uu interface, communicates with other eNodeBs by using an X2 interface, and communicates with an evolved packet core (EPC) by using an S1 interface. The eNodeB receives, by using an antenna, an uplink signal sent by the UE; completes receiving, demodulation, decoding, packet assembly, and the like of the uplink signal; and sends an uplink data packet to a mobility management entity/serving gateway (MME/S-GW). The eNodeB performs packet assembly, code modulation, and multi-antenna processing on downlink channel data, so as to form antenna port signals, and sends the antenna port signals to the UE by using antennas.

The antenna port signal involved in this embodiment of the present invention includes a downlink reference signal and a downlink physical channel. The downlink reference signal may include a cell-specific reference signal (CRS), a demodulation reference signal (DMRS), and a channel state indication-reference signal (CSI-RS). The downlink physical channel may include a physical downlink shared channel (PDSCH), a physical downlink control channel (PDCCH), a physical control format indicator channel (PCFICH), a physical broadcast channel (PBCH), a physical hybrid automatic repeat request indicator channel (PHICH), and a physical multicast channel (PMCH).

Figure 2:
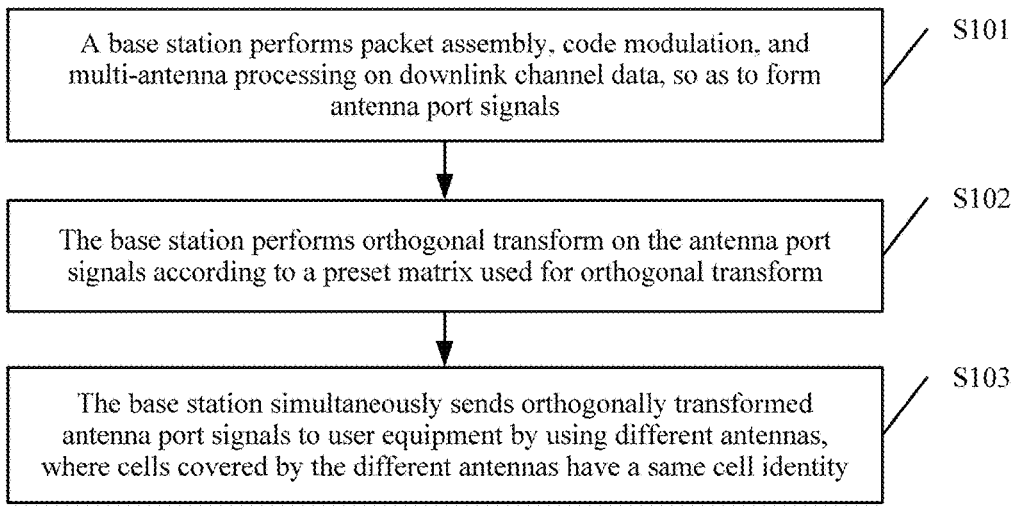
FIG. 2 is a schematic flowchart of a signal processing method according to an embodiment of the present invention.

Referring to FIG. 2, FIG. 2 is a schematic flowchart of a signal processing method according to an embodiment of the present invention. The method may include the following steps.

S101. A base station performs packet assembly, code modulation, and multi-antenna processing on downlink channel data, so as to form antenna port signals.

Specifically, when there is only one base station in a base station group, the base station performs packet assembly, code modulation, and multi-antenna processing on downlink channel data, so as to form antenna port signals, and a quantity of antenna ports formed by the base station is a total antenna port quantity of the base station group. When a base station group includes at least two base stations, first, all the base stations may mutually share respective downlink channel data, so that each base station obtains total downlink channel data; and each base station separately performs packet assembly, code modulation, and multi-antenna processing on the total downlink channel data, so as to form antenna port signals, and a quantity of antenna ports formed by each base station is a total antenna port quantity of the base station group. Alternatively, when a base station group includes at least two base stations, first, each base station separately performs packet assembly, code modulation, and multi-antenna processing on respective downlink channel data, so as to form antenna port signals; and then, all the base stations mutually share respective antenna ports formed by the base stations, so that an antenna port quantity obtained by each base station is a total antenna port quantity of the base station group. The base station group may include at least one base station. The base station group may constitute a distributed antenna system (DAS) or a distributed networking scenario. The distributed networking scenario may include macro-macro networking, macro-micro networking, and micro-micro networking.

S102. The base station performs orthogonal transform on the antenna port signals according to a preset matrix used for orthogonal transform.

Specifically, after the base station obtains all antenna port signals in a base station group in which the base station is located, the base station may perform orthogonal transform on all the antenna port signals according to the preset matrix used for orthogonal transform. A specific orthogonal transform process of the signals may be as follows: Linear superposition is separately performed on all the antenna port signals by using each row of elements in the matrix, and linear transform corresponding to all the rows of elements is mutually orthogonal. For example, the matrix used for orthogonal transform includes two rows of elements. Linear superposition is performed on all the antenna port signals by using the first row of elements, and linear superposition is performed on all the antenna port signals by using the second row of elements. The two linear superposition processes are referred to as orthogonal transform. Regardless of whether there is one or more base stations in the base station group, each base station may perform orthogonal transform on the antenna port signals according to the preset matrix used for orthogonal transform.

Because the antenna port signal includes a downlink reference signal and a downlink physical channel, the process of performing orthogonal transform on the antenna port signals according to the preset matrix used for orthogonal transform also means performing orthogonal transform on a downlink reference signal in each antenna port signal, and performing orthogonal transform on a downlink physical channel in each antenna port signal.

S103. The base station simultaneously sends orthogonally transformed antenna port signals to user equipment by using different antennas, where cells covered by the different antennas have a same cell identity.

Specifically, when there is one base station in the base station group, the base station simultaneously sends the orthogonally transformed antenna port signals to the user equipment by using the different antennas, so that channel powers of all antenna ports received by the user equipment can be always balanced, and downlink transmission efficiency is improved. When there is more than one base station in the base station group, the base station may send the orthogonally transformed antenna port signals to the user equipment by using antennas of the base station, and control other base stations in the base station group to simultaneously send the orthogonally transformed antenna port signals to the user equipment by using their respective antennas, so that channel powers of all antenna ports received by the user equipment are always balanced, and downlink transmission efficiency is improved. The cells covered by the different antennas have the same cell identity. This indicates that the different antennas are located in one base station group. It can be learned from step S102 that, at least one linearly superposed signal may be obtained after linear superposition is separately performed on the antenna port signals by using each row of elements in the matrix used for orthogonal transform. Therefore, the orthogonally transformed antenna port signals include at least one linearly superposed signal. A specific process in which the base station simultaneously sends the orthogonally transformed antenna port signals to the user equipment by using the different antennas is as follows: The base station simultaneously sends the at least one linearly superposed signal separately to the user equipment by using a corresponding antenna. Before the base station separately transmits the at least one linearly superposed signal to the corresponding antenna, the following steps further need to be performed: performing resource mapping, OFDM signal generation, and intermediate radio frequency transform processing on the at least one linearly superposed signal, and then outputting, to the corresponding antenna, at least one linearly superposed signal obtained after the processing. All the three processing manners: resource mapping, OFDM signal generation, and intermediate radio frequency transform are described in the prior art, and details are not further described herein.

In this embodiment of the present invention, orthogonal transform is performed on antenna port signals according to a preset matrix used for orthogonal transform, and orthogonally transformed antenna port signals are simultaneously sent to user equipment by using different antennas, so that channel powers of all antenna ports received by the user equipment are always balanced, and downlink transmission efficiency is improved.

Figure 3:
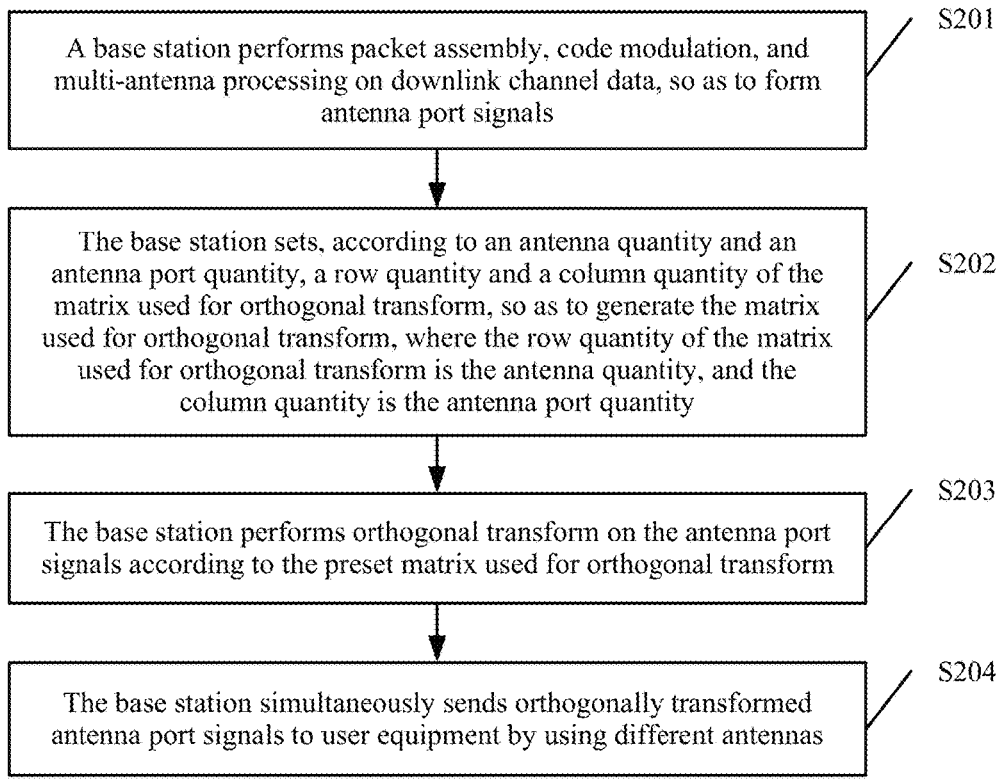
FIG. 3 is a schematic flowchart of another signal processing method according to an embodiment of the present invention.

Referring to FIG. 3, FIG. 3 is a schematic flowchart of another signal processing method according to an embodiment of the present invention. The method may include the following steps.

S201. A base station performs packet assembly, code modulation, and multi-antenna processing on downlink channel data, so as to form antenna port signals.

For a specific implementation manner of step S201, reference may be made to S101 in the foregoing embodiment corresponding to FIG. 2, and details are not described herein again.

S202. The base station sets, according to an antenna quantity and an antenna port quantity, a row quantity and a column quantity of the matrix used for orthogonal transform, so as to generate the matrix used for orthogonal transform, where the row quantity of the matrix used for orthogonal transform is the antenna quantity, and the column quantity is the antenna port quantity.

Specifically, a base station quantity of a base station group is determined, and an antenna quantity and an antenna port quantity of each base station in the base station group are separately obtained, so as to calculate an antenna quantity and an antenna port quantity of the base station group.

The antenna quantity of the base station group is set to the row quantity of the matrix used for orthogonal transform, and the antenna port quantity of the base station group is set to the column quantity of the matrix used for orthogonal transform, so as to generate the matrix used for orthogonal transform. Each element in the matrix used for orthogonal transform has an equal modulus value.

When the antenna port quantity is equal to the antenna quantity, the matrix used for orthogonal transform is an orthogonal matrix. For example, the matrix used for orthogonal transform is as follows:

[$a_{00}$, $a_{01}$, $a_{02}$, $a_{03}$
$a_{10}$, $a_{11}$, $a_{12}$, $a_{13}$
$a_{20}$, $a_{21}$, $a_{22}$, $a_{23}$
$a_{30}$, $a_{31}$, $a_{32}$, $a_{33}$].

When the antenna port quantity is less than the antenna quantity, the matrix used for orthogonal transform includes at least one submatrix that can constitute an orthogonal matrix. For example, the matrix used for orthogonal transform is as follows:

[$a_{00}$, $a_{01}$, $a_{02}$, $a_{03}$
$a_{10}$, $a_{11}$, $a_{12}$, $a_{13}$
$a_{20}$, $a_{21}$, $a_{22}$, $a_{23}$
$a_{30}$, $a_{31}$, $a_{32}$, $a_{33}$
. . . .
$a_{n0}$, $a_{n1}$, $a_{n2}$, $a_{n3}$], where the first row to the fourth row of elements in the matrix used for orthogonal transform may constitute an orthogonal matrix, and linear transform in each row of the fifth row to the $n^{th}$ row may be the same as or different from linear transform in the first four rows.

When the antenna port quantity is greater than the antenna quantity, the matrix used for orthogonal transform is a submatrix in an orthogonal matrix. For example, the matrix used for orthogonal transform is as follows:

[$a_{00}$, $a_{01}$, $a_{02}$, $a_{03}$
$a_{10}$, $a_{11}$, $a_{12}$, $a_{13}$], where two rows of elements in the matrix used for orthogonal transform are two rows in a 4×4 orthogonal matrix.

Optionally, when a change of the antenna port quantity and/or the antenna quantity is detected, the matrix used for orthogonal transform may be further updated. For example, when an increase of the antenna quantity is detected, the row quantity of the existing matrix used for orthogonal transform may be increased, so that a newly added antenna may also transmit a corresponding linearly superposed signal according to a newly added row of elements.

S203. The base station performs orthogonal transform on the antenna port signals according to the preset matrix used for orthogonal transform.

Specifically, a specific process in which the base station performs orthogonal transform on the antenna port signals is as follows: First, a correspondence between all rows of elements in the matrix used for orthogonal transform and the different antennas is set; and then, linear superposition is separately performed on the antenna port signals according to the rows of elements respectively corresponding to the different antennas, so as to obtain linearly superposed signals respectively corresponding to the different antennas. The linearly superposed signals include linearly superposed signals of the antenna port signals.

Figure 3A:
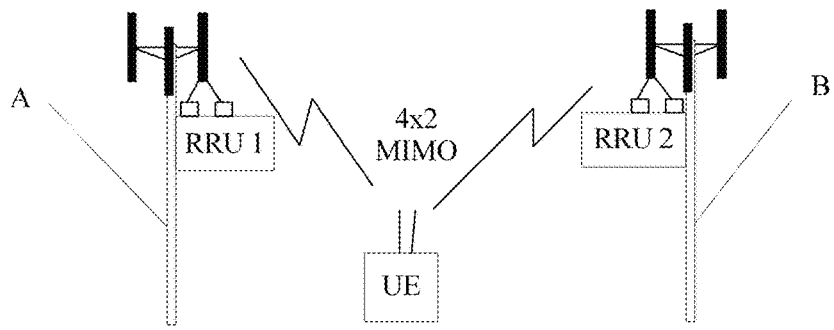
FIG. 3a is a schematic diagram of a signal processing scenario according to an embodiment of the present invention.

Referring to FIG. 3a as well, FIG. 3a is a schematic diagram of a signal processing scenario according to an embodiment of the present invention. FIG. 3a shows a distributed 4×2 MIMO networking scenario, and two base stations are used as an example for description. A base station A includes two antennas: an ANT0 and an ANT1, and a base station B includes two antennas: an ANT2 and an ANT3. Distributed 4×2 MIMO includes four antennas of the two base stations and two antennas of UE. In addition, a cell covered by the ANT0 and the ANT1 and a cell covered by the ANT2 and the ANT3 have a same cell identity. In the prior art, signals of an antenna ports (port0 and port1) of the base station A shown in FIG. 3a are separately sent to the UE by using the antenna ANT0 and the antenna ANT1, and signals of an antenna ports (port2 and port3) of the base station B are separately sent to the UE by using the antenna ANT2 and the antenna ANT3. However, in this embodiment of the present invention, both the base station A and the base station B shown in FIG. 3a first perform orthogonal transform on signals of the antenna port0 to the antenna port3 according to a matrix used for orthogonal transform; the base station A then separately sends orthogonally transformed signals of the antenna port0 to the antenna port3 to the UE by using the antenna ANT0 and the antenna ANT1, and the base station B also separately sends orthogonally transformed signals of the antenna port0 to the antenna port3 to the UE by using the ANT2 and the ANT3. A process in which the base station A and the base station B perform orthogonal transform on the signals of the antenna port0 to the antenna port3 is as follows:

If the preset matrix used for orthogonal transform is an orthogonal matrix A, and
the orthogonal matrix A=[a00, a01, a02, a03
a10, a11, a12, a13
a20, a21, a22, a23
a30, a31, a32, a33],
after orthogonal transform is performed on the signals of the antenna port0 to the antenna port3, the following is obtained:
a linearly superposed signal OUT0=(a00*port0+a01*port1+a02*port2+a03*port3);
a linearly superposed signal OUT1=(a10*port0+a11*port1+a12*port2+a13*port3);
a linearly superposed signal OUT2=(a20*port0+a21*port1+a22*port2+a23*port3); and
a linearly superposed signal OUT3=(a30*port0+a31*port1+a32*port2+a33*port3).

S204. The base station simultaneously sends orthogonally transformed antenna port signals to user equipment by using different antennas.

Specifically, after obtaining the orthogonally transformed antenna port signals, the base station may simultaneously sends the orthogonally transformed antenna port signals to the user equipment by using the different antennas. That is, the base station simultaneously sends at least one linearly superposed signal separately to the user equipment by using a corresponding antenna. The foregoing 4×2 MIMO networking scenario in FIG. 3a is used as an example. After the base station A and the base station B separately calculate the linearly superposed signal OUT0 to the linearly superposed signal OUT3, the base station A sends the OUT0 to the UE by using the ANT0, and the base station A further sends the OUT1 to the UE by using the ANT1. The base station B sends the OUT2 to the UE by using the ANT2, and the base station B sends the OUT3 to the UE by using the ANT3. Therefore, the two receive antennas of the UE may separately receive four linearly superposed signals.

If amplitude imbalance values of propagation paths from antennas respectively corresponding to the two base stations to the UE are p, power imbalance values of the propagation paths are the square of p, the two receive antennas used by the UE are respectively a receive antenna a and a receive antenna b, a received signal received by the UE by using the receive antenna a is R0, and a received signal received by using the receive antenna b is R1, R0 and R1 may be expressed as follows:

$$R_0 = [H_{00}, H_{01}, pH_{02}, pH_{03}] * [OUT_0, OUT_1, OUT_2, OUT_3]^T$$
$$= [H_{00}, H_{01}, pH_{02}, pH_{03}] * A * [port_0, port_1, port_2, port_3]^T$$
$$= (H_{00} * a_{00} + H_{01} * a_{10} + pH_{02} * a_{20} + pH_{03} * a_{30}) * port_0 +$$
$$(H_{00} * a_{01} + H_{01} * a_{11} + pH_{02} * a_{21} + pH_{03} * a_{31}) * port_1 +$$
$$(H_{00} * a_{02} + H_{01} * a_{12} + pH_{02} * a_{22} + pH_{03} * a_{32}) * port_2 +$$
$$(H_{00} * a_{03} + H_{01} * a_{13} + pH_{02} * a_{23} + pH_{03} * a_{33}) * port_3,$$

and $$R_1 = [H_{10}, H_{11}, pH_{12}, pH_{13}] * [OUT_0, OUT_1, OUT_2, OUT_3]^T$$
$$= [H_{10}, H_{11}, pH_{12}, pH_{13}] * A * [port_0, port_1, port_2, port_3]^T$$
$$= (H_{10} * a_{00} + H_{11} * a_{10} + pH_{12} * a_{20} + pH_{13} * a_{30}) * port_0 +$$
$$(H_{10} * a_{01} + H_{11} * a_{11} + pH_{12} * a_{21} + pH_{13} * a_{31}) * port_1 +$$
$$(H_{10} * a_{02} + H_{11} * a_{12} + pH_{12} * a_{22} + pH_{13} * a_{32}) * port_2 +$$
$$(H_{10} * a_{03} + H_{11} * a_{13} + pH_{12} * a_{23} + pH_{13} * a_{33}) * port_3,$$

where
H00 represents a physical channel between the ANT0 and the receive antenna a, H10 represents a physical channel between the ANT0 and the receive antenna b, H01 represents a physical channel between the ANT1 and the receive antenna a, H11 represents a physical channel between the ANT1 and the receive antenna b, H02 represents a physical channel between the ANT2 and the receive antenna a, H12 represents a physical channel between the ANT2 and the receive antenna b, H03 represents a physical channel between the ANT3 and the receive antenna a, and H13 represents a physical channel between the ANT3 and the receive antenna b. A channel power of the antenna port port0 in the received signal R1 is used as an example for deduction. A specific process is as follows:

The channel power of the antenna port port0 in R1 is:

$$E\{|H10*a00+H11*a10+pH12*a20+pH13*a30|^2\}=E\{|H10*a00|^2+|H11*a10|^2+|pH12*a20|^2+|pH13*a30|^2\}=W|a00|^2+W*|a10|^2+p*p*W*|a20|^2+p*p*W*|a30|^2=(2+2*p*p)*W$$

where E{ } represents a mathematical expectation operation, and $\|\|^2_2$ represents the square of a modulus value of a complex number. In the foregoing deduction process, it is assumed that the physical channels (H10 to H13) are mutually independent, an average value is 0, and a power is W, and a condition that a modulus value of each element in the orthogonal matrix A is equal to 1 is used. According to the same deduction process, it can be learned that channel powers of the antenna ports (port0 to port3) in R0 and channel powers of the antenna ports (port1 to port3) in R1 are all (2+2*p*p)*W. Therefore, after orthogonal transform is performed by using the orthogonal matrix A, channel powers of the four antenna ports are always balanced, so that MIMO performance deterioration caused by power imbalance is avoided. In addition, because orthogonal transform does not change physical channel relevancy, an MIMO multi-stream transmission effect is not affected.

Similarly, in a distributed MIMO or single frequency network (SFN) networking scenario, after orthogonal transform is performed on antenna port signals, remote radio units (RRUs) having different transmit and receive capabilities may also co-exist, and balance between channel powers of antenna ports received by the user equipment is not affected.

Similarly, in a distributed MIMO or SFN networking scenario, after orthogonal transform is performed on antenna port signals, when a fault occurs in some antennas, even when transmit powers of the faulty physical antennas are decreased to 0, balance between channel powers of antenna ports received by the user equipment may not be affected, and the user equipment may still receive all the antenna port signals fully, so that multiple data streams can be scheduled.

Figure 3B:
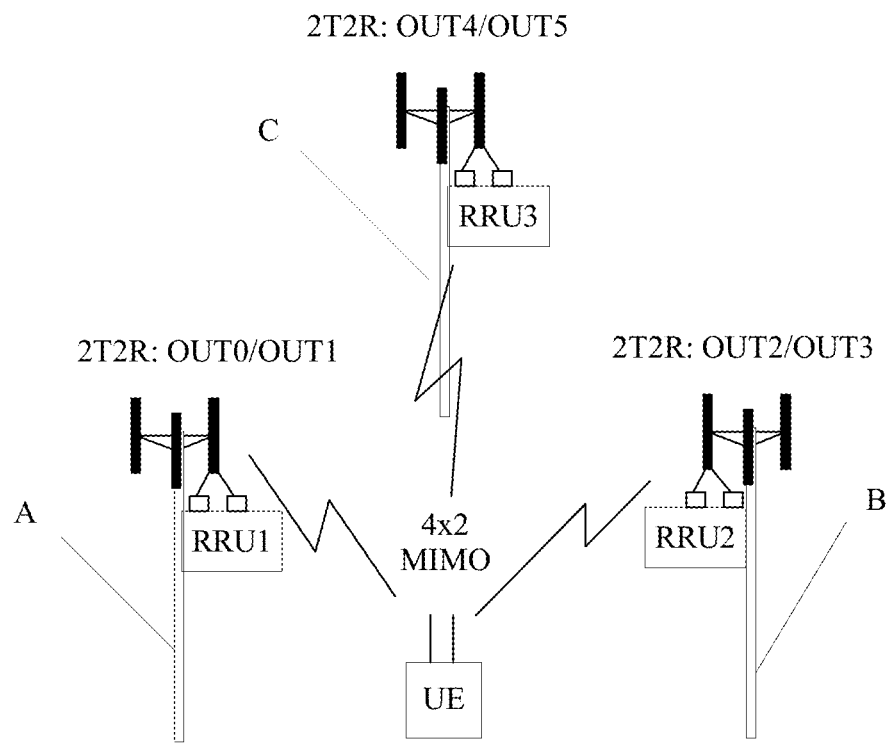
FIG. 3b is a schematic diagram of another signal processing scenario according to an embodiment of the present invention.
Figure 3C:
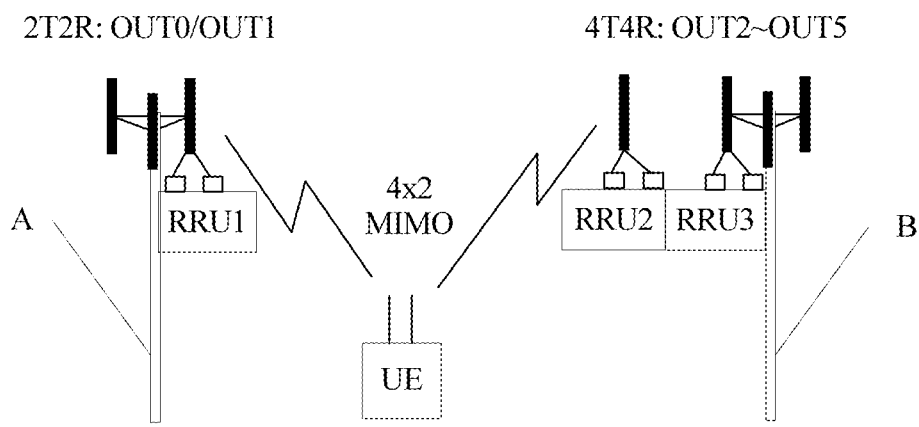
FIG. 3c is a schematic diagram of still another signal processing scenario according to an embodiment of the present invention.

Referring to both FIG. 3b and FIG. 3c, FIG. 3b is a schematic diagram of another signal processing scenario according to an embodiment of the present invention, and FIG. 3c is a schematic diagram of still another signal processing scenario according to an embodiment of the present invention.

After expansion, there may be at least two base stations in a base station group involved in this embodiment of the present invention. FIG. 3b is used as an example. FIG. 3b shows a distributed 4×2 MIMO networking scenario, and three base stations are used as an example for description. A base station A includes two antennas: an ANT0 and an ANT1, a base station B includes two antennas: an ANT2 and an ANT3, and a base station C includes two antennas: an ANT4 and an ANT5. Distributed 4×2 MIMO includes six antennas of the three base stations and two antennas of UE. In addition, a cell covered by the ANT0 and the ANT1, a cell covered by the ANT2 and the ANT2, and a cell covered by the ANT4 and the ANT4 all have a same cell identity. A process in which the base station A, the base station B, and the base station C perform orthogonal transform on signals of an antenna port port0 to an antenna port port3 is as follows:

If a preset matrix used for orthogonal transform is a matrix A, the first four rows of elements in the matrix A constitute an orthogonal matrix, linear transform in the last two rows is the same as linear transform in the first four rows, and the matrix A=[a00, a01, a02, a03
a10, a11, a12, a13
a20, a21, a22, a23
a30, a31, a32, a33
a40, a41, a42, a43,
a50, a51, a52, a53], after orthogonal transform is performed on the signals of the antenna port port0 to the antenna port port3, the following is obtained:

a linearly superposed signal OUT0=(a00*port0+a01*port1+a02*port2+a03*port3);

a linearly superposed signal OUT1=(a10*port0+a11*port1+a12*port2+a13*port3);

a linearly superposed signal OUT2=(a20*port0+a21*port1+a22*port2+a23*port3);

a linearly superposed signal OUT3=(a30*port0+a31*port1+a32*port2+a33*port3);

a linearly superposed signal OUT4=(a40*port0+a41*port1+a42*port2+a43*port3); and a linearly superposed signal OUT5=(a50*port0+a51*port1+a52*port2+a53*port3).

After obtaining the linearly superposed signal OUT0 to the linearly superposed signal OUT5, the base station A sends the OUT0 to the UE by using the ANT0, and the base station A further sends the OUT1 to the UE by using the ANT1; the base station B sends the OUT2 to the UE by using the ANT2, and the base station B sends the OUT3 to the UE by using the ANT3; and the base station C sends the OUT4 to the UE by using the ANT4, and the base station C sends the OUT5 to the UE by using the ANT5. Therefore, the two receive antennas of the UE may separately receive six linearly superposed signals. After orthogonal transform is performed by using the orthogonal matrix A, channel powers of the four antenna ports received by the UE are always balanced, so that MIMO performance deterioration caused by power imbalance is avoided. For a process in which the UE deduces the received channel powers of the antenna ports, reference may be made to a process that is described in step S205 in the foregoing embodiment corresponding to FIG. 3 and in which the UE deduces received channel powers of antenna ports, and details are not described herein again. In addition, because orthogonal transform does not change physical channel relevancy, an MIMO multi-stream transmission effect is not affected. It can be learned that, when there are at least two base stations in the base station group after expansion, a downlink performance loss caused by power imbalance may be still avoided, so that downlink transmission efficiency is improved.

Further, an antenna quantity corresponding to each base station in the base station group involved in this embodiment of the present invention may be unequal. FIG. 3c is used as an example. FIG. 3c shows a distributed 4×2 MIMO network working scenario, and two base stations are used as an example for description. A base station A includes two antennas: an ANT0 and an ANT1, and a base station B includes four antennas: an ANT2, an ANT3, an ANT4, and an ANT5. Distributed 4×2 MIMO includes six antennas of the two base stations and two antennas of UE. In addition, a cell covered by the ANT0 and the ANT1 and a cell covered by the ANT2, the ANT3, the ANT4, and the ANT5 have a same cell identity. A process in which the base station A and the base station B perform orthogonal transform on signals of an antenna port0 to an antenna port3 is as follows:

If a preset matrix used for orthogonal transform is a matrix A, the first four rows of elements in the matrix A constitute an orthogonal matrix, linear transform in the last two rows is the same as linear transform in the first four rows, and the matrix A=[a00, a01, a02, a03
a10, a11, a12, a13
a20, a21, a22, a23
a30, a31, a32, a33
a40, a41, a42, a43,
a50, a51, a52, a53], after orthogonal transform is performed on the signals of the antenna port0 to the antenna port3, the following is obtained:

a linearly superposed signal OUT0=(a00*port0+a01*port1+a02*port2+a03*port3);

a linearly superposed signal OUT1=(a10*port0+a11*port1+a12*port2+a13*port3);

a linearly superposed signal OUT2=(a20*port0+a21*port1+a22*port2+a23*port3);

a linearly superposed signal OUT3=(a30*port0+a31*port1+a32*port2+a33*port3);

a linearly superposed signal OUT4=(a40*port0+a41*port1+a42*port2+a43*port3); and a linearly superposed signal OUT5=(a50*port0+a51*port1+a52*port2+a53*port3).

After obtaining the linearly superposed signal OUT0 to the linearly superposed signal OUT5, the base station A sends the OUT0 to the UE by using the ANT0, and the base station A further sends the OUT1 to the UE by using the ANT1; and the base station B sends the OUT2 to the UE by using the ANT2, the base station B sends the OUT3 to the UE by using the ANT3, the base station B sends the OUT4 to the UE by using the ANT4, and the base station B sends the OUT5 to the UE by using the ANT5. Therefore, the two receive antennas of the UE may separately receive six linearly superposed signals. After orthogonal transform is performed by using the orthogonal matrix A, channel powers of the four antenna ports received by the UE are always balanced, so that MIMO performance deterioration caused by power imbalance is avoided. For a process in which the UE deduces the received channel powers of the antenna ports, reference may be made to a process that is described in step S205 in the foregoing embodiment corresponding to FIG. 3 and in which the UE deduces received channel powers of antenna ports, and details are not described herein again. It can be learned that, when an antenna quantity corresponding to each base station in the base station group is unequal, a downlink performance loss caused by power imbalance may be still avoided, so that downlink transmission efficiency is improved.

It can be learned that in this embodiment of the present invention, orthogonal transform is performed on antenna port signals according to a preset matrix used for orthogonal transform, and orthogonally transformed antenna port signals are simultaneously sent to user equipment by using antennas having different geographical locations, so that channel powers of all antenna ports received by the user equipment are always balanced, and downlink transmission efficiency is improved.

Figure 4:
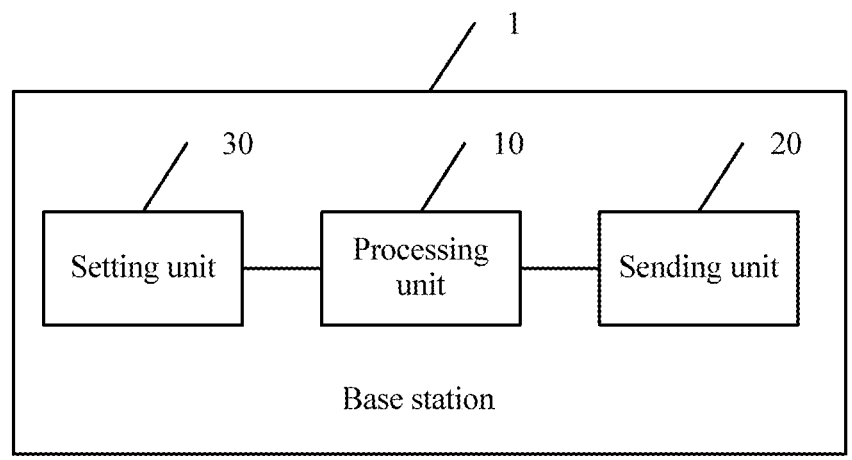
FIG. 4 is a schematic structural diagram of a base station according to an embodiment of the present invention.

Referring to FIG. 4, FIG. 4 is a schematic structural diagram of a base station according to an embodiment of the present invention. The base station 1 may include: a processing unit 10, a sending unit 20, and a setting unit 30.

The processing unit 10 is configured to perform packet assembly, code modulation, and multi-antenna processing on downlink channel data, so as to form antenna port signals.

Specifically, when there is only one base station 1 in a base station group, the processing unit 10 of the base station 1 may perform packet assembly, code modulation, and multi-antenna processing on downlink channel data, so as to form antenna port signals, and a quantity of antenna ports formed by the base station is a total antenna port quantity of the base station group. When a base station group includes at least two base stations, first, both the processing unit 10 of the base station 1 and a processing unit of another base station in the base station group may mutually share respective downlink channel data, so that each base station obtains total downlink channel data; and then, the processing unit 10 of the base station 1 and the processing unit of the another base station in the base station group separately perform packet assembly, code modulation, and multi-antenna processing on the total downlink channel data, so as to form antenna port signals, and a quantity of antenna ports formed by each base station is a total antenna port quantity of the base station group. Alternatively, when a base station group includes at least two base stations, first, the processing unit 10 of the base station 1 and a processing unit of another base station in the base station group separately performs packet assembly, code modulation, and multi-antenna processing on respective downlink channel data, so as to form antenna port signals; and then, the processing unit 10 of the base station 1 and the processing unit of the another base station in the base station group mutually share respective antenna ports formed by the base stations, so that an antenna port quantity obtained by each base station is a total antenna port quantity of the base station group. The base station group may include at least one base station. The base station group may constitute a distributed antenna system or a distributed networking scenario. The distributed networking scenario may include macro-macro networking, macro-micro networking, and micro-micro networking.

The processing unit 10 is further configured to perform orthogonal transform on the antenna port signals according to a preset matrix used for orthogonal transform.

Specifically, after the processing unit 10 obtains all antenna port signals in a base station group in which the base station 1 is located, the processing unit 10 may further perform orthogonal transform on all the antenna port signals according to the preset matrix used for orthogonal transform. A specific orthogonal transform process of the signals may be as follows: Linear superposition is separately performed on all the antenna port signals by using each row of elements in the matrix, and linear transform corresponding to all the rows of elements is mutually orthogonal. For example, the matrix used for orthogonal transform includes two rows of elements. The processing unit 10 performs linear superposition on all the antenna port signals by using the first row of elements, and performs linear superposition on all the antenna port signals by using the second row of elements. The two linear superposition processes are referred to as orthogonal transform. Regardless of whether there is one or more base stations in the base station group, a processing unit of each base station may perform orthogonal transform on the antenna port signals according to the preset matrix used for orthogonal transform.

The processing unit 10 is specifically configured to: set a correspondence between all rows of elements in the matrix used for orthogonal transform and the different antennas, and then separately perform linear superposition on the antenna port signals according to the rows of elements respectively corresponding to the different antennas, so as to obtain linearly superposed signals respectively corresponding to the different antennas. The correspondence means that all the rows of elements and the different antennas are in a one-to-one correspondence, and the linearly superposed signals include linearly superposed signals of the antenna port signals.

The sending unit 20 is configured to simultaneously send orthogonally transformed antenna port signals to user equipment by using different antennas, where cells covered by the different antennas have a same cell identity.

Specifically, when there is one base station in the base station group, the sending unit 20 of the base station 1 simultaneously sends the orthogonally transformed antenna port signals to the user equipment by using the different antennas, so that channel powers of all antenna ports received by the user equipment can be always balanced, and downlink transmission efficiency is improved. When there is more than one base station in the base station group, the sending unit 20 of the base station 1 may send the orthogonally transformed antenna port signals to the user equipment by using antennas of the base station, and control other base stations in the base station group to simultaneously send the orthogonally transformed antenna port signals to the user equipment by using their respective antennas, so that channel powers of all antenna ports received by the user equipment are always balanced, and downlink transmission efficiency is improved. The cells covered by the different antennas have the same cell identity. This indicates that the different antennas are located in one base station group. It can be learned from step S102 that, at least one linearly superposed signal may be obtained after linear superposition is separately performed on the antenna port signals by using each row of elements in the matrix used for orthogonal transform. Therefore, the orthogonally transformed antenna port signals include at least one linearly superposed signal. A specific process in which the sending unit 20 simultaneously sends the orthogonally transformed antenna port signals to the user equipment by using the different antennas is as follows: The sending unit 20 simultaneously sends the at least one linearly superposed signal separately to the user equipment by using a corresponding antenna. Before the sending unit 20 separately transmits the at least one linearly superposed signal to the corresponding antenna, the following steps further need to be performed: performing resource mapping, OFDM signal generation, and intermediate radio frequency transform processing on the at least one linearly superposed signal, and then outputting, to the corresponding antenna, at least one linearly superposed signal obtained after the processing. All the three processing manners: resource mapping, OFDM signal generation, and intermediate radio frequency transform are described in the prior art, and details are not further described herein.

The foregoing distributed 4×2 MIMO networking scenario shown in FIG. 3a is used as an example, and two base stations are used as an example for description. A base station A includes two antennas: an ANT0 and an ANT1, and a base station B includes two antennas: an ANT2 and an ANT3. Distributed 4×2 MIMO includes four antennas of the two base stations and two antennas of UE. In addition, a cell covered by the ANT0 and the ANT1 and a cell covered by the ANT2 and the ANT3 have a same cell identity. A process in which a processing unit of the base station A and a processing unit of the base station B perform orthogonal transform on signals of an antenna port port0 to an antenna port port3 is as follows:

If a preset matrix used for orthogonal transform is an orthogonal matrix A, and the orthogonal matrix A=[a00, a01, a02, a03
a10, a11, a12, a13
a20, a21, a22, a23
a30, a31, a32, a33], after performing orthogonal transform on the signals of the antenna port port0 to the antenna port port3, the processing units of the two base stations both obtain the following:

a linearly superposed signal OUT0=(a00*port0+a01*port1+a02*port2+a03*port3);

a linearly superposed signal OUT1=(a10*port0+a11*port1+a12*port2+a13*port3);

a linearly superposed signal OUT2=(a20*port0+a21*port1+a22*port2+a23*port3); and a linearly superposed signal OUT3=(a30*port0+a31*port1+a32*port2+a33*port3).

A sending unit of the base station A sends the OUT0 to the UE by using the ANT0, and the sending unit of the base station A further sends the OUT1 to the UE by using the ANT1. A sending unit of the base station B sends the OUT2 to the UE by using the ANT 2, and the sending unit of the base station B sends the OUT3 to the UE by using the ANT3. Therefore, the two receive antennas of the UE may separately receive four linearly superposed signals, and channel powers of the four antenna ports received by the UE are always balanced, so that MIMO performance deterioration caused by power imbalance is avoided. In addition, because orthogonal transform does not change physical channel relevancy, an MIMO multi-stream transmission effect is not affected.

The setting unit 30 is configured to set, according to an antenna quantity and an antenna port quantity, a row quantity and a column quantity of the matrix used for orthogonal transform, so as to generate the matrix used for orthogonal transform, where each element in the matrix used for orthogonal transform has an equal modulus value.

Specifically, the row quantity of the matrix used for orthogonal transform is the antenna quantity, and the column quantity is the antenna port quantity. The setting unit 30 performs the foregoing step before the processing unit 10 performs orthogonal transform on the antenna port signals. The setting unit 30 determines a base station quantity of a base station group, and then separately obtains an antenna quantity and an antenna port quantity of each base station in the base station group, so as to calculate an antenna quantity and an antenna port quantity of the base station group.

The setting unit 30 sets the antenna quantity of the base station group to the row quantity of the matrix used for orthogonal transform, and sets the antenna port quantity of the base station group to the column quantity of the matrix used for orthogonal transform, so as to generate the matrix used for orthogonal transform. Each element in the matrix used for orthogonal transform has an equal modulus value.

When the antenna port quantity is equal to the antenna quantity, the matrix used for orthogonal transform is an orthogonal matrix. For example, the matrix used for orthogonal transform is as follows:

[a00, a01, a02, a03
a10, a11, a12, a13
a20, a21, a22, a23
a30, a31, a32, a33].

When the antenna port quantity is less than the antenna quantity, the matrix used for orthogonal transform includes at least one submatrix that can constitute an orthogonal matrix. For example, the matrix used for orthogonal transform is as follows:

[a00, a01, a02, a03
a10, a11, a12, a13
a20, a21, a22, a23
a30, a31, a32, a33
. . . .
an0, an1, an2, an3], where the first row to the fourth row of elements in the matrix used for orthogonal transform may constitute an orthogonal matrix, and linear transform in each row of the fifth row to the $n^{th}$ row may be the same as or different from linear transform in the first four rows.

When the antenna port quantity is greater than the antenna quantity, the matrix used for orthogonal transform is a submatrix in an orthogonal matrix. For example, the matrix used for orthogonal transform is as follows:

[a00, a01, a02, a03
a10, a11, a12, a13], where two rows of elements in the matrix used for orthogonal transform are two rows in a 4×4 orthogonal matrix.

Optionally, when a change of the antenna port quantity and/or the antenna quantity is detected, the setting unit 30 may further update the matrix used for orthogonal transform. For example, when an increase of the antenna quantity is detected, the setting unit 30 may increase the row quantity of the existing matrix used for orthogonal transform, so that a newly added antenna may also transmit a corresponding linearly superposed signal according to a newly added row of elements.

It can be learned that in this embodiment of the present invention, orthogonal transform is performed on antenna port signals according to a preset matrix used for orthogonal transform, and orthogonally transformed antenna port signals are simultaneously sent to user equipment by using antennas having different geographical locations, so that channel powers of all antenna ports received by the user equipment are always balanced, and downlink transmission efficiency is improved.

An embodiment of the present invention further provides a computer storage medium. The computer storage medium may store a program. When the program runs, some or all of steps of a signal processing method described in the foregoing method embodiments in FIG. 1 to FIG. 3c.

Figure 5:
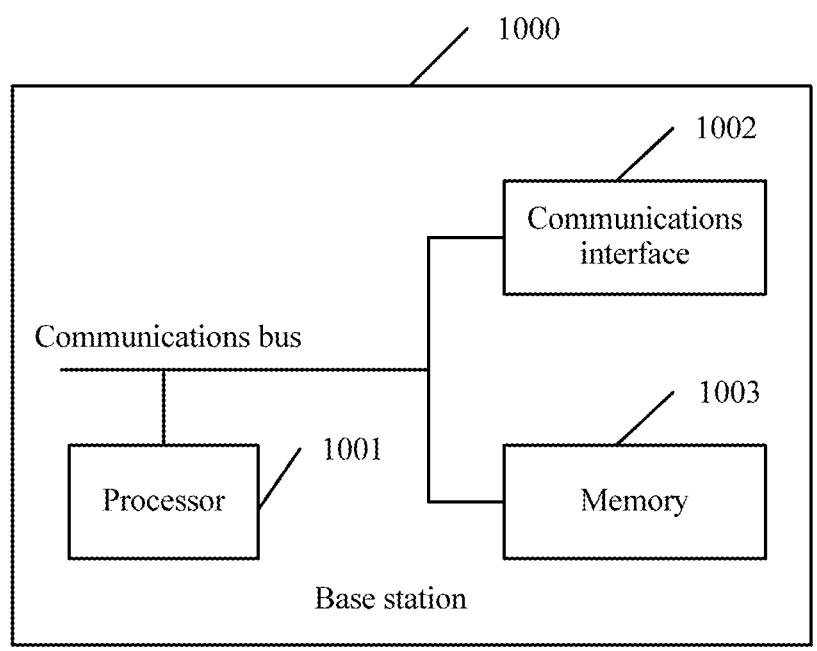
FIG. 5 is a schematic structural diagram of another base station according to an embodiment of the present invention.

Referring to FIG. 5, FIG. 5 is a schematic structural diagram of another base station according to an embodiment of the present invention. The base station 1000 may include: a processor 1001, a communications interface 1002, and a memory 1003 (there may be one or more processors 1001 in the base station 1000, and one processor 1001 is used as an example in FIG. 5). In some embodiments of the present invention, the processor 1001, the communications interface 1002, and the memory 1003 may be connected by using a communications bus or in other manners, and an example in which a connection is implemented by using the communications bus is used in FIG. 5.

The communications interface 1002 is configured to communicate with user equipment.

The memory 1003 is configured to store a program.

The processor 1001 is configured to execute the program, so as to implement the following steps: performing packet assembly, code modulation, and multi-antenna processing on downlink channel data, so as to form antenna port signals; performing orthogonal transform on the antenna port signals according to a preset matrix used for orthogonal transform; and simultaneously sending orthogonally transformed antenna port signals to the user equipment by using different antennas, where cells covered by the different antennas have a same cell identity.

The processor 1001 is further configured to: set, according to an antenna quantity and an antenna port quantity, a row quantity and a column quantity of the matrix used for orthogonal transform, so as to generate the matrix used for orthogonal transform, where each element in the matrix used for orthogonal transform has an equal modulus value, the row quantity of the matrix used for orthogonal transform is the antenna quantity, and the column quantity is the antenna port quantity.

When the antenna port quantity is equal to the antenna quantity, the matrix used for orthogonal transform is an orthogonal matrix; or when the antenna port quantity is less than the antenna quantity, the matrix used for orthogonal transform includes at least one submatrix that can constitute an orthogonal matrix; or when the antenna port quantity is greater than the antenna quantity, the matrix used for orthogonal transform is a submatrix in an orthogonal matrix.

The processor 1001 is specifically configured to: set a correspondence between all rows of elements in the matrix used for orthogonal transform and the different antennas, where the correspondence means that all the rows of elements and the different antennas are in a one-to-one correspondence; and separately perform linear superposition on the antenna port signals according to the rows of elements respectively corresponding to the different antennas, so as to obtain linearly superposed signals respectively corresponding to the different antennas, where the linearly superposed signals include linearly superposed signals of the antenna port signals.

The processor 1001 is further configured to: when a change of the antenna port quantity and/or the antenna quantity is detected, update the matrix used for orthogonal transform.

It can be learned that in this embodiment of the present invention, orthogonal transform is performed on antenna port signals according to a preset matrix used for orthogonal transform, and orthogonally transformed antenna port signals are simultaneously sent to user equipment by using antennas having different geographical locations, so that channel powers of all antenna ports received by the user equipment are always balanced, and downlink transmission efficiency is improved.

What are disclosed above are merely exemplary embodiments of the present invention, and certainly are not intended to limit the protection scope of the present invention. Therefore, equivalent variations made in accordance with the claims of the present invention shall fall within the scope of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   performing, by a base station, packet assembly, code modulation, and multi-antenna processing on downlink channel data, so as to form antenna port signals;
   performing, by the base station, orthogonal transform on the antenna port signals according to a preset matrix for orthogonal transform, wherein a row quantity and a column quantity of the matrix for orthogonal transform respectively correspond to an antenna quantity and an antenna port quantity; and
   simultaneously sending, by the base station, orthogonally transformed antenna port signals to user equipment using different antennas, wherein cells covered by the different antennas have a same cell identity.

2. The method according to claim 1, wherein before performing, by the base station, the orthogonal transform on the antenna port signals according to the preset matrix for orthogonal transform, the method further comprises:
   setting, by the base station according to the antenna quantity and the antenna port quantity, the row quantity and the column quantity of the matrix for orthogonal transform, so as to generate the matrix for orthogonal transform, wherein each element in the matrix for orthogonal transform has an equal modulus value, the row quantity of the matrix for orthogonal transform is the antenna quantity, and the column quantity is the antenna port quantity.

3. The method according to claim 2, wherein:
   when the antenna port quantity is equal to the antenna quantity, the matrix for orthogonal transform is an orthogonal matrix;
   when the antenna port quantity is less than the antenna quantity, the matrix for orthogonal transform comprises a submatrix that constitutes an orthogonal matrix; and
   when the antenna port quantity is greater than the antenna quantity, the matrix for orthogonal transform is a submatrix in an orthogonal matrix.

4. The method according to claim 2, wherein performing, by the base station, orthogonal transform on the antenna port signals according to the preset matrix for orthogonal transform comprises:
   setting a correspondence between all rows of elements in the matrix for orthogonal transform and the different antennas, wherein the correspondence comprises all the rows of elements and the different antennas being in a one-to-one correspondence; and
   separately performing linear superposition on the antenna port signals according to the rows of elements respectively corresponding to the different antennas, so as to obtain linearly superposed signals respectively corresponding to the different antennas;
   wherein the linearly superposed signals comprise linearly superposed signals of the antenna port signals.

5. The method according to claim 1, further comprising:
   when a change of an antenna port quantity, an antenna quantity, or both is detected, updating, by the base station, the matrix for orthogonal transform.

6. A base station, comprising:
   a processor;
   a communications interface; and
   a non-transitory memory;
   wherein the communications interface is configured to communicate with user equipment;
   wherein the memory is configured to store a program; and
   wherein the processor is configured to execute the program, so as to implement the following:

performing packet assembly, code modulation, and multi-antenna processing on downlink channel data, so as to form antenna port signals;

performing orthogonal transform on the antenna port signals according to a preset matrix for orthogonal transform, wherein a row quantity and a column quantity of the matrix for orthogonal transform respectively correspond to an antenna quantity and an antenna port quantity; and simultaneously sending orthogonally transformed antenna port signals to the user equipment using different antennas, wherein cells covered by the different antennas have a same cell identity.

7. The base station according to claim 6, wherein the processor is further configured to execute the program, so as to implement the following:

setting, according to the antenna quantity and the antenna port quantity, the row quantity and the column quantity of the matrix for orthogonal transform, so as to generate the matrix for orthogonal transform, wherein each element in the matrix for orthogonal transform has an equal modulus value, the row quantity of the matrix for orthogonal transform is the antenna quantity, and the column quantity is the antenna port quantity.

8. The base station according to claim 7, wherein:

when the antenna port quantity is equal to the antenna quantity, the matrix for orthogonal transform is an orthogonal matrix;

when the antenna port quantity is less than the antenna quantity, the matrix for orthogonal transform comprises a submatrix that constitutes an orthogonal matrix; and when the antenna port quantity is greater than the antenna quantity, the matrix for orthogonal transform is a submatrix in an orthogonal matrix.

9. The base station according to claim 7, wherein the processor is further configured to execute the program, so as to implement the following:

setting a correspondence between all rows of elements in the matrix for orthogonal transform and the different antennas, wherein the correspondence comprises all the rows of elements and the different antennas being in a one-to-one correspondence; and separately performing linear superposition on the antenna port signals according to the rows of elements respectively corresponding to the different antennas, so as to obtain linearly superposed signals respectively corresponding to the different antennas;

wherein the linearly superposed signals comprise linearly superposed signals of the antenna port signals.

10. The base station according to claim 7, wherein the processor is further configured to execute the program, so as to implement the following:

when a change of the antenna port quantity, the antenna quantity, or both, is detected, update the matrix for orthogonal transform.

11. A base station, comprising:

a processor;

a communications interface, configured to communicate with user equipment; and a computer-readable storage medium storing a program to be executed by the processor, the program including instructions for:

performing packet assembly, code modulation, and multi-antenna processing on downlink channel data, so as to form antenna port signals;

performing orthogonal transform on the antenna port signals according to a preset matrix for orthogonal transform, wherein a row quantity and a column quantity of the matrix for orthogonal transform respectively correspond to an antenna quantity and an antenna port quantity, wherein the base station is in a base station group with a plurality of base stations, the antenna quantity is of each antenna in the base station group, and the antenna port quantity is of each antenna port in the base station group; and simultaneously sending orthogonally transformed antenna port signals to the user equipment using different antennas, wherein cells covered by the different antennas have a same cell identity.

12. The base station according to claim 11, wherein the program further includes instructions for:

setting, according to the antenna quantity and the antenna port quantity, the row quantity and the column quantity of the matrix for orthogonal transform, so as to generate the matrix for orthogonal transform, wherein each element in the matrix for orthogonal transform has an equal modulus value, the row quantity of the matrix for orthogonal transform is the antenna quantity, and the column quantity is the antenna port quantity.

13. The base station according to claim 12, wherein:

when the antenna port quantity is equal to the antenna quantity, the matrix for orthogonal transform is an orthogonal matrix;

when the antenna port quantity is less than the antenna quantity, the matrix for orthogonal transform comprises a submatrix that constitutes an orthogonal matrix; and when the antenna port quantity is greater than the antenna quantity, the matrix for orthogonal transform is a submatrix in an orthogonal matrix.

14. The base station according to claim 12, wherein the program further includes instructions for:

setting a correspondence between all rows of elements in the matrix for orthogonal transform and the different antennas, wherein the correspondence comprises all the rows of elements and the different antennas being in a one-to-one correspondence; and separately performing linear superposition on the antenna port signals according to the rows of elements respectively corresponding to the different antennas, so as to obtain linearly superposed signals respectively corresponding to the different antennas;

wherein the linearly superposed signals comprise linearly superposed signals of the antenna port signals.

15. The base station according to claim 11, wherein the program further includes instructions for:

when a change of the antenna port quantity, the antenna quantity, or both, is detected, update the matrix for orthogonal transform.

16. The base station according to claim 11, wherein the downlink channel data is total downlink channel data that is shared between the plurality of base stations of the base station group.

17. The base station according to claim 11, wherein the downlink channel data is downlink channel data specific to the base station.

* * * * *